United States Patent
Bernett

(10) Patent No.: US 12,453,678 B2
(45) Date of Patent: Oct. 28, 2025

(54) ARTICLE FOR MOISTURIZING SKIN AND MANUFACTURING METHOD THEREOF

(71) Applicant: Bee Well Therapeutics LLC, Ormond Beach, FL (US)

(72) Inventor: Andrew Scott Bernett, Ormond Beach, FL (US)

(73) Assignee: Bee Well Therapeutics LLC, Ormond Beach, FL (US)

( * ) Notice: Subject to any disclaimer, the term of this patent is extended or adjusted under 35 U.S.C. 154(b) by 363 days.

(21) Appl. No.: 18/225,797

(22) Filed: Jul. 25, 2023

(65) Prior Publication Data
US 2024/0350373 A1    Oct. 24, 2024

Related U.S. Application Data

(60) Provisional application No. 63/461,235, filed on Apr. 21, 2023.

(51) Int. Cl.
| | | |
|---|---|---|
| *A61K 8/02* | (2006.01) | |
| *A61K 8/85* | (2006.01) | |
| *A61Q 19/00* | (2006.01) | |

(52) U.S. Cl.
CPC .............. *A61K 8/0212* (2013.01); *A61K 8/85* (2013.01); *A61Q 19/007* (2013.01); *A61K 2800/24* (2013.01); *A61K 2800/81* (2013.01); *A61K 2800/87* (2013.01); *A61K 2800/95* (2013.01)

(58) Field of Classification Search
CPC .... A61K 8/0212; A61K 8/85; A61K 2800/24; A61K 2800/81; A61K 2800/87; A61K 2800/95; A61K 8/0208; A61Q 19/007; A61Q 19/00
See application file for complete search history.

(56) References Cited

U.S. PATENT DOCUMENTS

| | | |
|---|---|---|
| 3,896,807 A | 7/1975 | Buchalter |
| 5,869,072 A | 2/1999 | Berry |
| 6,274,154 B1 | 8/2001 | Chou |
| 6,772,443 B2 | 8/2004 | Soerens et al. |
| 2004/0013713 A1 | 1/2004 | Berry et al. |

FOREIGN PATENT DOCUMENTS

WO    2017181245 A1    10/2017

OTHER PUBLICATIONS

Professor Pincushion, How to Make Beeswax Fabric, 2018, Youtube (Year: 2018).*
Beeswax-Modified Textiles: Method of Preparation and Assessment of Antimicrobial Properties. Polymers, 2020 (Year: 2020).*
Szulc et al., "Beeswax Modified Textiles: Method of Preparation and Assessment of Antimicrobial Properties", Polymers Journal, Feb. 2020, 12, 344; doi:10.3390/polym12020344, www.mdpi.com/journal/polymers.

* cited by examiner

*Primary Examiner* — Susan T Tran
*Assistant Examiner* — John Seungjai Kwon
(74) *Attorney, Agent, or Firm* — Lippes Mathias LLP; Mitchell Ghaneie; Joseph Chen

(57) ABSTRACT

The present invention provides an article for moisturizing skin comprising a fibrous substrate including cotton and polyester, impregnated and thermally cured with a mixture of beeswax and mineral oil. A method for manufacturing the article comprising the steps of providing an article including cotton and polyester; heating a quantity of beeswax with a quantity of mineral oil over heat to form a mixture; saturating the article with the mixture until either one or both of visual clues or auditory cues are provided to signal uniform impregnation; drying the article; applying alcohol to the article to remove a portion of the mineral oil from the article; applying detergent to the article to remove the alcohol and the residual mineral oil from the article; absorbing the residual beeswax on the article by a cloth sleeve; and thermal curing the remaining mixture on the article.

13 Claims, 5 Drawing Sheets

ARTICLE FOR MOISTURIZING SKIN AND MANUFACTURING METHOD THEREOF

CROSS-REFERENCE TO RELATED APPLICATION

This application claims the benefit of U.S. Provisional Application No. 63/461,235, filed Apr. 21, 2023, and is hereby incorporated by reference in its entirety for all purposes.

FIELD OF THE INVENTION

The present disclosure relates generally to an article for moisturizing skin and manufacturing method thereof.

BACKGROUND

Dry skin is due to many reasons, such as frequent hand washing, use of hand sanitizers, and conditions of the environment and weather. It has impacted about 25 percent to 30 percent of the population in the United States. Moreover, excessively dry skin may be uncomfortable and cause itching, peeling of skin, scaling or cracking. Thus, treating dry skin is necessary.

The current treatment for extremely dry skin conditions is to apply prescription topical ointments or lotions to the skin and cover with cotton or rubber materials to hold the ointment onto the dry skin and to prevent scratching while sleeping. However, the untreated cotton materials absorb a great amount of medication, leaving only a fraction of the medication being applied to the skin. Rubber has better occlusion but consequently creates a maceration problem if left on the skin for too long.

Thus, it is desirable to provide an over-the-counter article for moisturizing skin that is breathable and has great occlusion.

BRIEF SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention, nor does it seek to identify or describe any critical or significant elements of the invention or the boundaries of its scope. Its sole purpose is to provide a rudimentary understanding of the invention's concepts and features, which will be expounded upon in greater detail in the ensuing sections.

The present disclosure is generally directed towards an article for moisturizing skin with a treated textile and a manufacturing method thereof, which may be more specifically directed towards a beeswax-treated garment for moisturizing skin and a manufacturing method thereof. The article can be placed in contact with the dry skin of any human body part and can be used in combination with a lotion or other liquid substance. The article may include, but is not limited to a glove, sleeve, a bandage, footwear, face mask or other garment known in the art that may apply.

The article includes a fibrous substrate, preferably comprising a blend of a predetermined percentage of cotton and a predetermined percentage of polyester, wherein the predetermined percentage of cotton is greater than the predetermined percentage of polyester. The fibrous substrate is impregnated with a mixture of beeswax and mineral oil and thermal cured such that the mixture binds with the fibrous substrate.

In an alternative embodiment, the article comprises at least two layers, one layer being an inner layer and the other layer being an outer layer. Preferably, the inner layer comprises cotton and the outer layer comprises polyester.

The method for manufacturing the article comprises the steps of providing an article including a predetermined percentage of cotton and a predetermined percentage of polyester; heating a predetermined quantity of beeswax with a predetermined quantity of mineral oil over heat to a predetermined temperature to form a pliable mixture; saturated the article with the mixture until visual clues or auditory cues are provided to signal uniform impregnation; drying the article; applying alcohol to the article to remove a portion of the mineral oil from the article; applying a detergent wash to the article to remove the alcohol and the residual mineral oil from the article; enclosing the article in a cloth sleeve to allow the sleeve to absorb the residual beeswax mixture in the article; and thermal curing the article by warm air, drying at a predetermined temperature in order to absorb the remaining residual beeswax mixture in the article and to retain the impregnated wax mixture in place within the article.

When applying the glove to dry skin, dry skin is relieved, and the skin is moisturized. Further, combination of cotton and polyester provide a good occlusion and allow the glove to be breathable.

DETAILED DESCRIPTION OF THE EMBODIMENTS

The following detailed description and accompanying drawings provide a comprehensive disclosure of exemplary embodiments for the purpose of facilitating one of ordinary skill in the relevant art to make and use the invention. Therefore, the detailed description of the one or more exemplary embodiments presented herein are purely exemplary in nature, are not intended to limit the scope of the invention or its protection in any manner, and should therefore be interpreted such that additional varying embodiments are anticipated.

The invention is generally directed towards an article for moisturizing skin with treated textile and manufacturing method thereof, and more specifically, which may be more specifically directed towards a beeswax-treated garment for moisturizing skin and manufacturing method thereof. The article may include, but is not limited to, a glove, a sleeve, a bandage, footwear, a face mask or other garment known in the art that may apply. Accordingly, a non-limiting, exemplary embodiment (the "Exemplary Embodiment) of an article for moisturizing skin, a glove 1, and manufacturing method thereof are disclosed herein.

Figure 1:
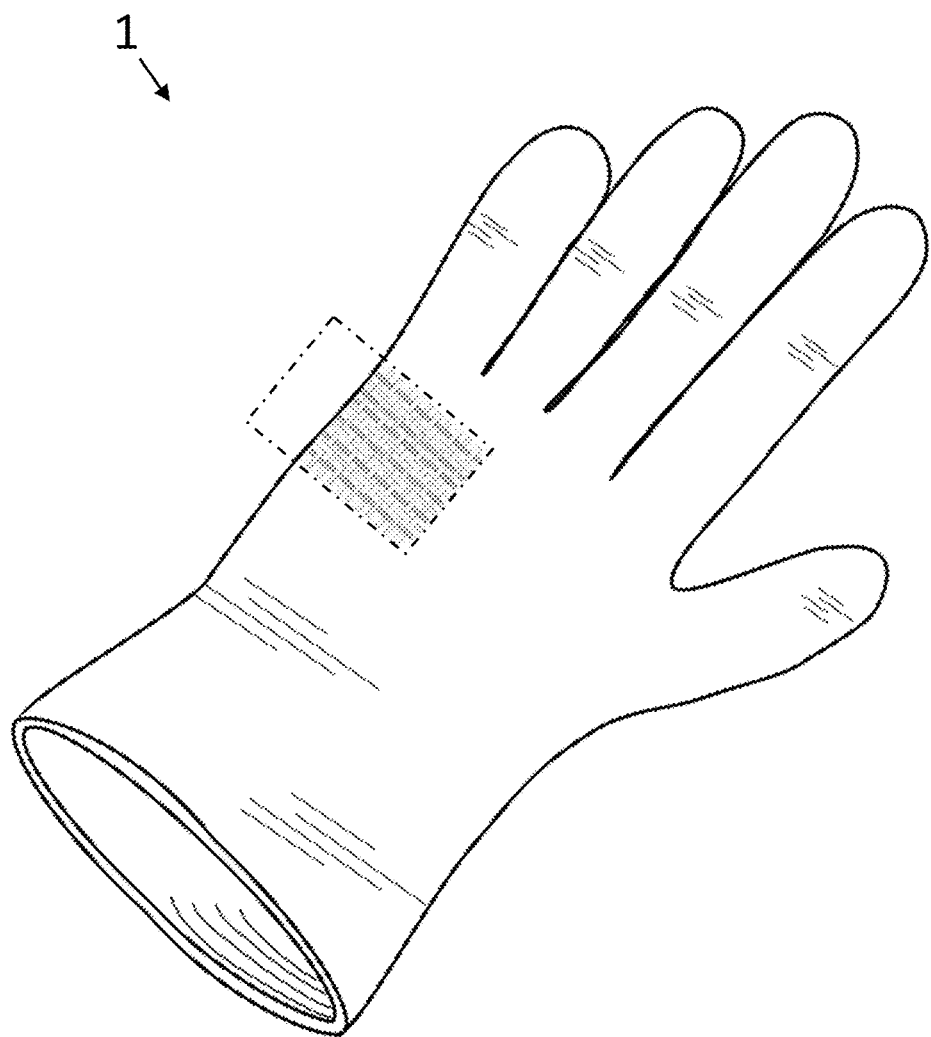
FIG. 1 depicts a perspective view of an exemplary embodiment of a glove for moisturizing skin.
Figure 2:
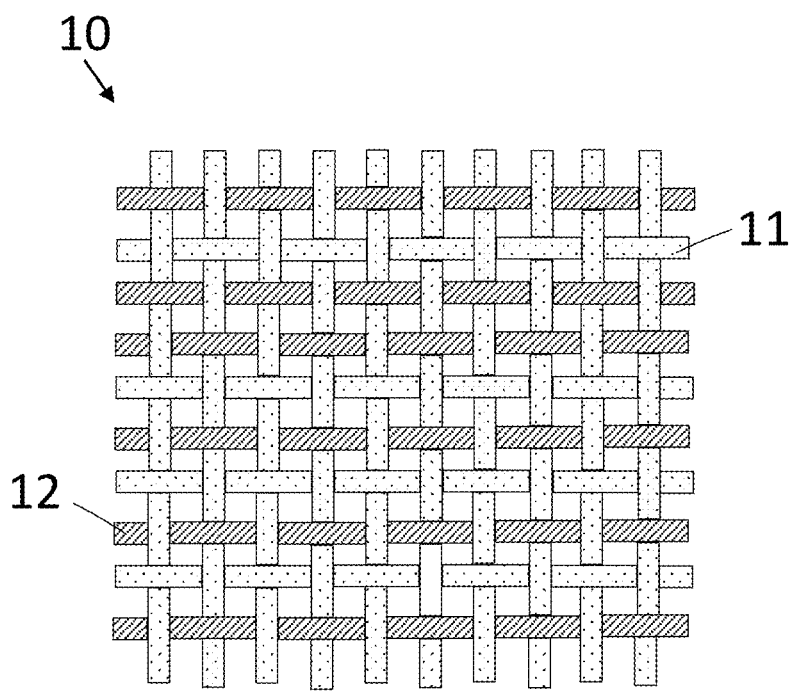
FIG. 2 depicts an enlarged view of a portion of the exemplary embodiment of the glove for moisturizing skin before impregnation.
Figure 3:
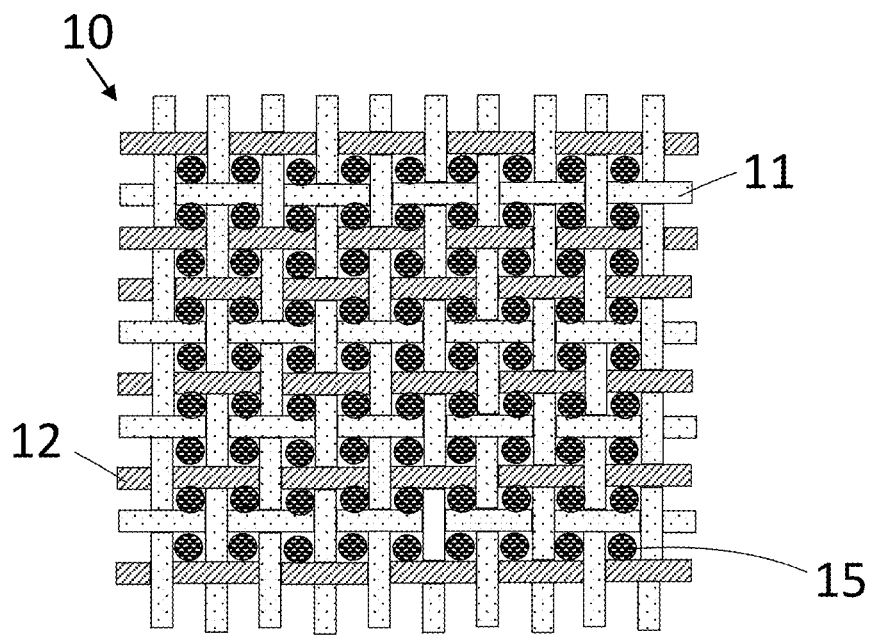
FIG. 3 depicts an enlarged view of the portion of the exemplary embodiment of the glove for moisturizing skin after impregnation.

The untreated Exemplary Embodiment of the glove 1, as shown in FIGS. 1 and 2, includes a fibrous substrate 10 including at least a blend of a predetermined percentage of cotton 11 and a predetermined percentage of polyester 12 fibers. The untreated fibrous substrate 10 is impregnated with a mixture 15 of beeswax and mineral oil and then the impregnated fibrous substrate 10 is thermally cured such that the mixture 15 binds to the fibrous substrate 10, as shown in FIG. 3. The predetermined percentage of the cotton 11 is greater than the predetermined percentage of the polyester 12. The ratio between the cotton 11 and polyester 12 fibers is preferably 75 to 25 weight percentage. It is anticipated that the cotton 11 and polyester 12 of the fibrous substrate 10 can be blended at a fibre stage, joined or interwoven by warp and weft at a yarn stage or alternative techniques for joining the distinct materials without departing from the spirit of the invention.

Figure 4:
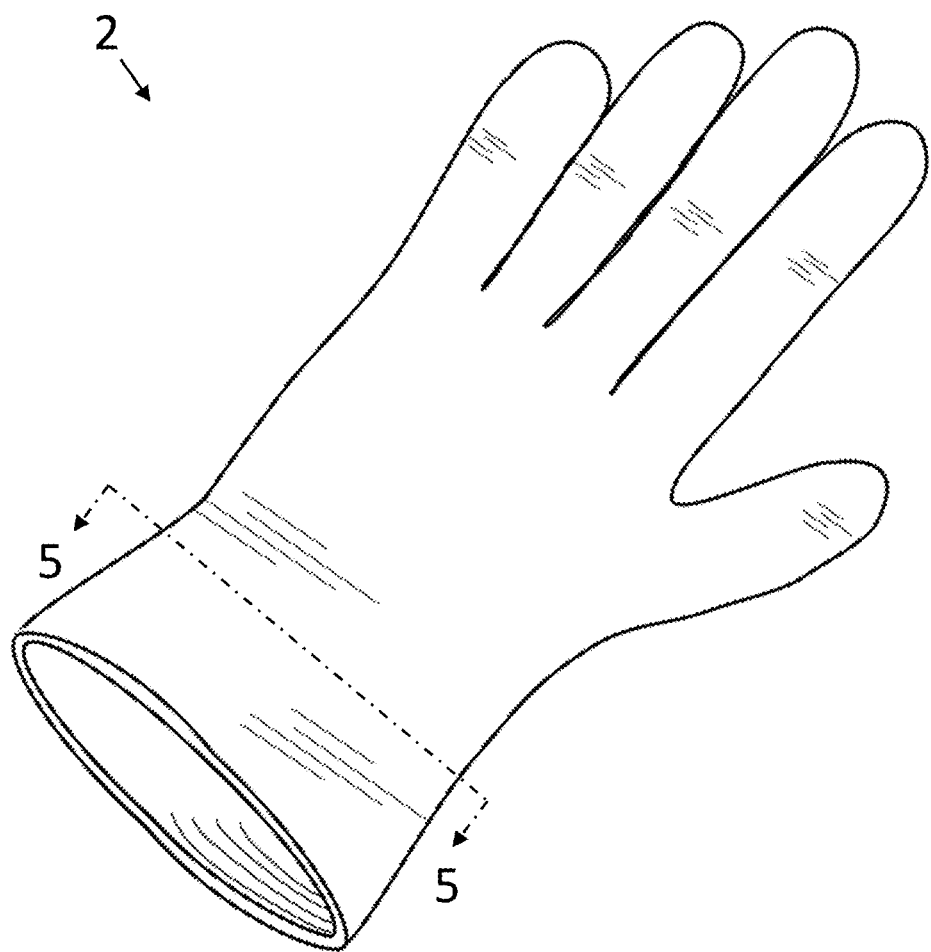
FIG. 4 depicts a perspective view of an alternative embodiment of the glove for moisturizing skin.
Figure 5:
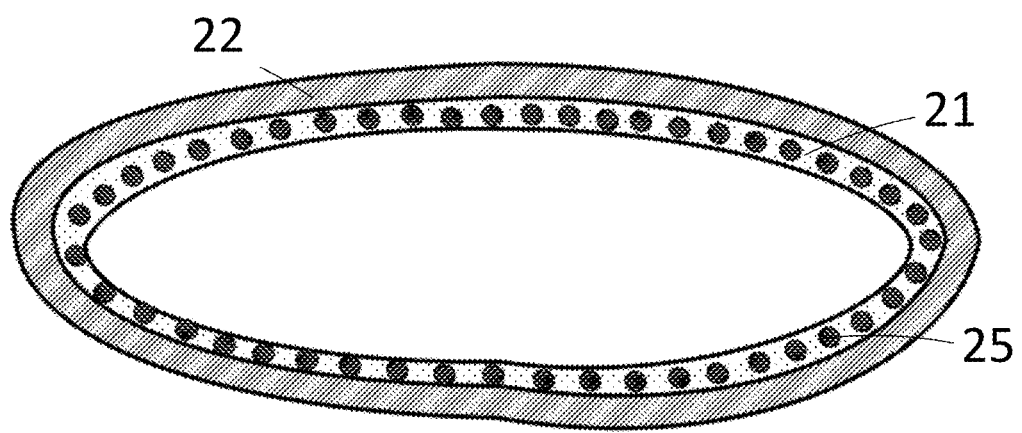
FIG. 5 depicts a cross-sectional view taken along line 5-5 in FIG. 4.

Referring to FIGS. 4 and 5, in an alternative embodiment, the glove 2 comprises at least two layers 21, 22, an inner layer 21 comprising cotton and an outer layer 22 comprising polyester. The distinct characteristics of cotton (higher hydrophilicity, greater porosity) and polyester (higher hydrophobicity, smaller porosity) endow the two layers 21, 22 with distinct sorption of the mixture 25 of beeswax and mineral oil. As such, due to the hydrophilicity of the inner layer 21 and hydrophobicity of the outer layer 22, when the glove 2 is impregnated with the beeswax and mineral oil mixture 25, the mixture 25 binds substantially only the inner layer 21.

Still in an alternative embodiment, preferably a sock (not shown), the fibrous substrate 10 at least includes a predetermined percentage of cotton 11, a predetermined percentage of polyester 12 and a predetermined percentage of spandex. It is also anticipated an additional alternative embodiment for the fibrous substrate 10 may at least comprise cotton 11, polyester 12, nylon and spandex. It is anticipated that the cotton 11 is preferably in a range of between 50 to 80 percent by weight of the fibrous substrate 10. Preferably, the polyester 12 may vary between 15 to 48 percent by weight of the fibrous substrate 10. The spandex is preferably in a range of between 1 to 4 percent by weight of the fibrous substrate. The nylon may be up to 2 percent by weight of the fibrous substrate 10. Besides the foregoing combinations of materials for the exemplary embodiment and the respective alternative embodiments, the alternative embodiments may have the following ratios by weight percentage: between the cotton 11, polyester 12 and spandex fibers the ratio may be 52 to 47 to 1; and between the cotton 11, polyester 12, nylon and spandex fibers the ration may be 64 percent cotton 11, 32 percent polyester 12, 3 percent nylon and 1 percent spandex or 65 percent cotton 11, 30 percent polyester 12, 4 percent spandex and 1 percent nylon. It is anticipated that silver or antimicrobial mesh can be added to the article to reduce the possibility of infection.

Figure 6:
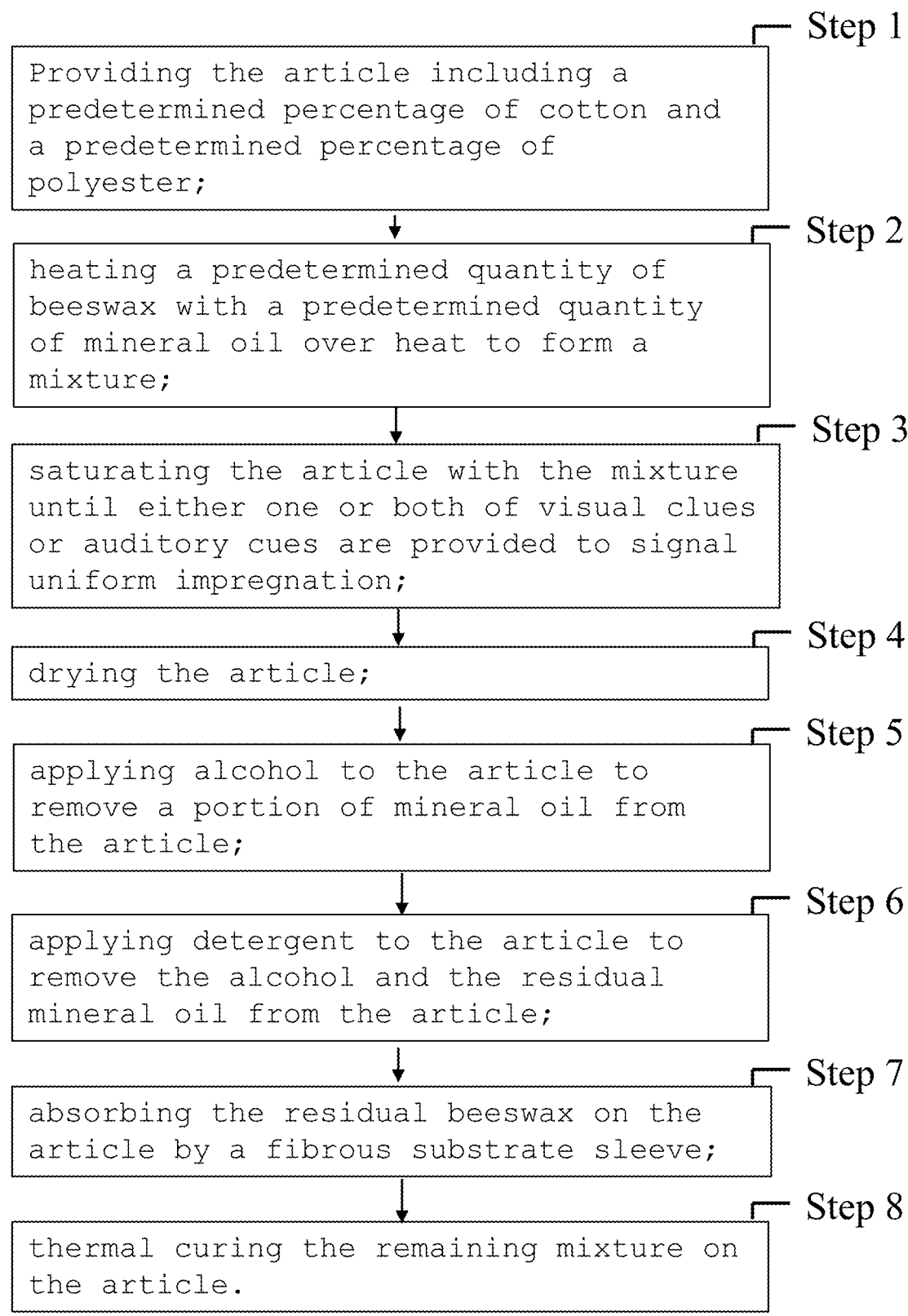
FIG. 6 is the diagram showing a method of manufacturing an article for moisturizing skin.

Referring to FIG. 6, the exemplary embodiment of the manufacturing method of the article for moisturizing skin is presented herein and is further demonstrated by the exemplary article, the glove 1, and at least one alternative embodiment for a sock. It is anticipated that several steps may be sequentially interchangeable and equivalent application of one or more permutations of such sequentially interchangeable steps does not alter the spirit of the invention in any meaningful way.

The untreated glove 1, as shown in FIGS. 1 and 2, provided for initiating the process (step 1) includes a predetermined percentage of cotton 11 and a predetermined percentage of polyester 12. While the ratio of cotton 11 to polyester 12 may vary, it is preferable for the ratio to be 75 percent cotton 11 and 25 percent polyester 12 by weight. In an alternative embodiment, such as untreated socks (not shown), the sock includes preferably 52 percent cotton 11, 47 percent polyester 12 and 1 percent spandex or 64 percent cotton 11, 32 percent polyester 12, 3 percent nylon and 1 percent spandex by weight. It is anticipated that the foregoing combinations of the materials that comprise the glove 1 and the sock may vary. In an alternative embodiment, as shown in FIGS. 4 and 5, the glove 2 comprises at least an inner layer 21 of cotton and an outer layer 22 of polyester.

A pretreatment step of prewashing may be included if needed to remove contamination from the article. Examples of the prewashing include either by hand or by machine. The exemplary glove 1 is prewashed, preferably by a washing machine, with a detergent to water ratio which may be approximately 110 liters of water to 60 to 80 milliliters of detergent under or below room temperature, such that the glove 1 is not overheated to cause porosity of the glove 1 to decrease. It is anticipated that bleach may also be added to the foregoing detergent and water. It is further anticipated that the method of prewashing and the foregoing mixtures of water, detergent, and possibly bleach, may vary.

Then, a mixture 15 is formed by heating (step 2), preferably, beeswax in an amount of about 65 percent to about 75 percent by weight with mineral oil in an amount of about 25 percent to about 35 percent by weight at a predetermined temperature and mixed until well blended. More preferably, the beeswax of the mixture 15 is in the amount of about 70 percent by weight and the mineral oil is in the amount of about 30 percent by weight. Examples of mixing the mixture 15 may include, but not limited to, stirring, agitating, or whisking. The heating of the mixture 15 may include heating over direct heat or indirect heat, and for example, may be heated by utilizing a double boiler. The predetermined temperature of the mixture 15 should ideally be controlled lower than 120 degrees Celsius, preferably, 100 degrees Celsius to prevent the beeswax from burning or overheating. The choice of beeswax may include white beeswax or yellow beeswax. However, white beeswax that is filtered three times is preferred, because pollen and impurities from yellow beeswax are removed. The mineral oil adjusts the viscosity of the mixture and provides a soft but pliable texture. Moreover, mineral oil is food safe, uncommon to cause allergy reactions, and has low reactivity and a suitable boiling point.

Next, saturation of the article is performed (step 3). Examples of the saturation process may include soaking, dipping, physically kneading, implementation of a vacuum chamber, or any combination thereof. The exemplary glove 1 is saturated in the mixture 15 until visual clues or auditory cues are provided to signal uniform impregnation. In the exemplary embodiment, the saturation of the glove 1 is performed within a vacuum chamber with an atmosphere of about 0.75. As the air is removed from the vacuum chamber, bubbles form in the mixture 15. Once the bubbles in the mixture 15 have ceased to be visible or audible, the mixture 15 is impregnated into pores of the glove 1 evenly, as shown in FIG. 3. In an alternative embodiment, the glove 1 is dipped, soaked, or physically kneaded in the mixture 15 until the glove is uniformly colored.

Next, the exemplary glove 1 is dried (step 4), preferably airdried in ambient temperature, and then washed by alcohol (step 5), preferably by hand and with alcohol which is about 75 percent isopropyl alcohol, to remove a portion of mineral oil from the glove 1. Afterwards, a mild detergent (step 6), such as soap, is applied to the glove 1 to remove the alcohol and the residual mineral oil of the glove 1, thereby reducing the possibility of a reaction when applying the glove 1 to dry skin. Preferably, the detergent to water ratio is approximately 113 liters of water to 60 to 80 milliliters of detergent.

Lastly, a thermal curing process is performed to the article. The exemplary glove 1 is placed in a cloth sleeve (step 7), preferable a cotton sleeve, and into a clothes dryer to absorb residual beeswax and to thermally cure (step 8) the remaining mixture 15 at a temperature lower than 120 degrees Celsius, preferably, about 55 to 75 degrees Celsius for about 40 minutes, thereby the glove 1 is bound with the mixture 15 and the mixture 15 will not transfer to other materials. In an alternative embodiment, the exemplary socks are thermally cured for about 90 minutes. It is anticipated that the thermal curing time may differ according to the quantity, weight or type of the article. The thermal curing process increases binding of the mixture 15 to the article and prevents the mixture 15 from transferring to another material when in use or shipped.

While the embodiments of the invention have been disclosed, certain modifications may be made by those skilled in the art to modify the invention without departing from the spirit of the invention.

NUMBER REFERENCES

1—Exemplary Embodiment of the Glove
10—Fibrous Substrate
11—Cotton
12—Polyester
15—Mixture
2—Alternative Embodiment of the Glove
21—Inner Layer
22—Outer Layer
25—Mixture

What is claimed is:

1. A method for manufacturing an article for moisturizing skin, comprising:
    a) providing an article comprising a blend of a predetermined percentage of cotton and a predetermined percentage of polyester;
    b) heating and mixing a predetermined quantity of beeswax with a predetermined quantity of mineral oil over heat to form a mixture;
    c) saturating the article with the mixture until either one or both of visual clues or auditory cues are provided to signal uniform impregnation, wherein the article is saturated in a vacuum chamber forming bubbles, wherein one of the visual clues is bubbles ceased to be visible; and
    wherein one of the auditory cues is bubbles ceased to be audible
    d) drying the article;
    e) applying alcohol to the article to remove a portion of the mineral oil from the article;
    f) applying detergent to the article to remove the alcohol and the residual mineral oil from the article;
    g) absorbing the residual beeswax on the article by a cloth sleeve; and
    h) thermal curing the remaining mixture on the article.

2. The method as described in claim 1, wherein the article includes a glove, a sleeve, footwear, a bandage, or a face mask.

3. The method as described in claim 1, wherein the predetermined percentage of the cotton to the polyester is 75 percent to 25 percent by weight.

4. The method as described in claim 1, wherein the article further comprises nylon, spandex, or a combination thereof.

5. The method as described in claim 1, wherein a percentage by weight between the predetermined quantity of beeswax and the predetermined quantity of mineral oil is 65 to 75 percent of beeswax and 25 to 35 percent of mineral oil.

6. The method as described in claim 1, wherein one of the visual clues is the article uniformly colored.

7. The method as described in claim 1, wherein the article is thermally cured under 120 degrees Celsius.

8. A method for manufacturing an article for moisturizing skin, comprising:
    a) providing an article including an inner layer and an outer layer;
        wherein the inner layer comprises cotton;
        wherein the outer layer comprises polyester;
    b) heating a predetermined quantity of beeswax with a predetermined quantity of mineral oil over heat to form a mixture;
    c) saturating the article with the mixture until either one or both of visual clues or auditory cues are provided to signal uniform impregnation;
    d) drying the article;
    e) applying alcohol to the article to remove a portion of the mineral oil from the article;
    (f) applying detergent to the article to remove the alcohol and the residual mineral oil from the article;
    (g) absorbing the residual beeswax on the article by a cloth sleeve; and
    (h) thermal curing the remaining mixture on the article.

9. The method as described in claim 8, wherein the article is a glove, a sleeve, footwear, a bandage, or a face mask.

10. The method as described in claim 8, wherein a percentage by weight between the predetermined quantity of beeswax and the predetermined quantity of mineral oil is 65 to 75 percent of beeswax and 25 to 35 percent of mineral oil.

11. The method as described in claim 8, wherein the article is saturated in a vacuum chamber forming bubbles;
    wherein one of the visual clues is bubbles ceased to be visible; and
    wherein one of the auditory cues is bubbles ceased to be audible.

12. The method as described in claim 8, wherein one of the visual clues is the article uniformly colored.

13. The method as described in claim 8, wherein the article is thermally cured below 120 degrees Celsius.

\* \* \* \* \*